Patented Mar. 5, 1940

2,192,611

UNITED STATES PATENT OFFICE

2,192,611

CATTLE FEED AND PROCESS OF MAKING SAME

Alfred H. Kelling, Oak Park, Ill., assignor, by mesne assignments, to Corn Products Refining Company, New York, N. Y., a corporation of New Jersey No Drawing. Application June 25, 1938, Serial No. 215,854

6 Claims. (Cl. 99—2)

This invention relates to the production of cattle feed containing starch as an ingredient, for example to the production of cattle feed made from or containing corn slop from the wet starch industry which themselves contain a considerable percentage of starch; and the primary object of the invention is to so treat such starch bearing materials, preferably by gelatinization of the starch, as to increase the water absorption capacity of the feed, which is desirable from a dietetic standpoint. The gelatinization of the starch also increases the digestibility of the feed.

A further object of the invention is to provide an inexpensive and nutritious cattle feed from corn slop and other constituents of corn. A more specific object is to utilize in the production of cattle feed the by-products of the corn starch and corn sugar industry.

In preparing the cattle feed in accordance with the present invention, slop from the wet milling starch process, coarse or fine slop, or a mixture of the same, that is the bran and fibers screened out of the starch liquor by means of the systems of copper and silk reels or shakers, (the copper system being shown as the coarse slop system and the silk as the fine slop system), may be and preferably is used as the principal ingredient of the feed, although other starch bearing materials may also be employed. The slop, before or after it is mixed with the other ingredient or ingredients of the feed, is treated to bring about the gelatinization, or partial gelatinization of its starch content. Ordinary fine slop from the starch mixing process will contain 30% to 40% by weight of starch, dry substance basis, while coarse slop will contain about 8% to 12%. The protein content of fine slop is about 10% to 15%, and of coarse slop about 1% to 2%; and this ingredient has, of course, some food value.

By "gelatinization" is meant the expansion and ultimate disruption of the starch granules under the influence of heat in the presence of water. The gelatinized starch will have the capacity of absorbing several times its own weight of water. The water absorption capacity is very greatly increased over that of raw starch. The disruption of the starch cells makes the starch more easily digested so that the feed product has the characteristic of pre-digestibility.

A suitable way of gelatinizing the starch in the slop is to cause the slop in a moist condition, containing from 30% to 60%, preferably between 45% and 55%, by weight, of water, to be passed over heated surfaces, for example between hollow internally steam heated rolls set close enough together to exert considerable pressure on the material. With the slop, before or after the gelatinizing treatment, is preferably mixed a starch conversion product containing starch sugar or dextrose together with other conversion substances. As cost of materials is an important consideration in the production of cattle feeds, hydrol, that is, mother liquor or residual corn syrup from the crystallization of dextrose or starch sugar massecuites, is preferably used in this connection. The hydrol is mixed with the gelatinized slop in suitable proportions and the mixture dried in any suitable manner. Hydrol adds to the feed, in an inexpensive and unobjectionable form, easily digestible carbohydrates which are desirable constituents. It is also possible to add to the feed a considerable portion of concentrated steep water, that is liquid derived from the steeping of the corn prior to the milling and separating operations, which liquid contains soluble corn substances of dietary value. Steep water can be added to the extent, for example of 20%, dry substance basis, either before or after gelatinization, without counteracting to any considerable extent the effect of gelatinization in increasing water absorption capacity.

The following are specific examples of the application of the invention to practice. It will be understood that the operating data here given are merely illustrative and informative. The invention is not limited to these particulars.

Example 1

With three parts by weight, dry substance basis, of slop from the wet milling starch process, two parts of which consist of coarse slop and one of fine slop, is mixed one part of hydrol at 30° to 42° Baumé. The mixture having a moisture content of 45% to 55% is passed between hollow cylinders revolving at about three revolutions per minute and heated internally by steam to a superficial temperature of about 290° Fahrenheit. The material is then, preferably, dried to about 10% moisture. The water absorption capacity of the product will be in the neighborhood of 5 to 1; that is, the material will absorb about five times its weight of water.

Example 2

To the ingredients of Example 1 is added one part, dry substance basis, of steep water, at the concentration of the steep water as it comes from the evaporators.

If the slop ingredient in the above examples consists entirely of fine slop, the water absorption capacity will be about 8 to 1. If coarse slop alone be used, the water absorption capacity will be about 4 to 1. Stated otherwise, gelatinization increases the coarse slop water absorption about 10% to 20%. It increases the fine slop water absorption capacity about 100%.

The gelatinization of the starch in the slop may be brought about by other methods than pressure between heated rolls, for example, by spray drying the material under temperature conditions to bring about the desired modification of the starch, or by a combination of treatment between heated rolls and spray drying.

It is the intention to claim herein all equivalents and also all modifications within the scope of the appended claims. The term "gelatinization" is intended to cover a partial as well as a complete disruption of the starch granules.

I claim:

1. Cattle feed consisting principally of corn slop from the manufacture of starch from corn containing, in addition to bran and fibre, starch and some gluten, with the starch in a gelatinized state whereby the water absorption capacity of the product is increased.

2. Cattle feed comprising corn slop from the manufacture of starch from corn, corn syrup and corn steep water, the slop containing, in addition to bran and fibre, starch and some gluten with the starch in a gelatinized state whereby the water absorption capacity of the product is increased.

3. Process of making cattle feed which comprises: mixing corn syrup and corn steep water with slop from the manufacture of starch from corn to provide a mixture containing 30%–60% water, by weight, and then passing the mixture between heated rolls to gelatinize the starch in the slop whereby the water absorption capacity of the feed is increased.

4. Process of making cattle feed which comprises: mixing approximately 3 parts by weight, dry substance basis, of slop from the manufacture of starch from corn with 1 part of hydrol at 30°–42° Baumé; and passing the mixture, with a moisture content of about 45%–55%, between heated rolls to gelatinize the starch and dry the material.

5. Process of making cattle feed which comprises subjecting corn slop from the manufacture of starch from corn, said slop having a moisture content of about 45–55%, to starch gelatinizing heat and mechanical pressure to gelatinize the starch contained therein and adding to said corn slop a starch conversion product containing starch sugar.

6. Process according to claim 5 in which there is added as an ingredient, steep water.

ALFRED H. KELLING.